(12) United States Patent
Wan

(10) Patent No.: US 7,461,168 B1
(45) Date of Patent: Dec. 2, 2008

(54) METHOD AND SYSTEM FOR ADDRESSING AUDIO-VISUAL CONTENT FRAGMENTS

(75) Inventor: Ernest Yiu Cheong Wan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/662,705

(22) Filed: Sep. 15, 2000

(30) Foreign Application Priority Data

Sep. 27, 1999 (AU) .................................... PQ3122

(51) Int. Cl.
G06F 15/16 (2006.01)
G06F 17/30 (2006.01)
H04J 3/24 (2006.01)

(52) U.S. Cl. .................. 709/245; 709/217; 709/219; 707/1; 370/471; 370/474

(58) Field of Classification Search ................. 709/245
See application file for complete search history.

(56) References Cited

U.S. PATENT DOCUMENTS

| | | | |
|---|---|---|---|
| 4,939,726 A * | 7/1990 | Flammer et al. ............ 370/400 |
| 5,408,469 A * | 4/1995 | Opher et al. ................ 370/399 |
| 5,878,219 A | 3/1999 | Vance, Jr. et al. ...... 395/200.47 |
| 5,881,242 A * | 3/1999 | Ku et al. .................... 709/238 |
| 5,890,162 A * | 3/1999 | Huckins ................ 707/104.1 |
| 5,918,012 A | 6/1999 | Astiz et al. ............. 395/200.47 |
| 5,929,849 A | 7/1999 | Kikinis ........................ 345/327 |
| 5,956,716 A * | 9/1999 | Kenner et al. ............... 709/217 |
| 6,154,771 A * | 11/2000 | Rangan et al. .............. 709/217 |
| 6,269,394 B1 * | 7/2001 | Kenner et al. ............... 709/217 |
| 6,400,996 B1 * | 6/2002 | Hoffberg et al. ............ 709/223 |
| 6,473,396 B1 * | 10/2002 | Kumar ........................ 370/220 |
| 6,473,804 B1 * | 10/2002 | Kaiser et al. ................ 709/245 |
| 6,476,833 B1 * | 11/2002 | Moshfeghi ................... 345/854 |
| 6,763,370 B1 * | 7/2004 | Schmeidler et al. ......... 709/203 |
| 7,017,188 B1 * | 3/2006 | Schmeidler et al. ......... 709/203 |

FOREIGN PATENT DOCUMENTS

EP  0 507 743  10/1992

(Continued)

OTHER PUBLICATIONS

Brassil, Jack et al. "Program Insertion in Real-Time IP Multicasts." ACM SIGCOMM Computer Communication Review. ACM Press. vol. 29, Issue 2, pp. 49=68. Apr. 1999.*

(Continued)

Primary Examiner—Jason Cardone
Assistant Examiner—Jeffrey R Swearingen
(74) Attorney, Agent, or Firm—Fitzpatrick, Cella, Harper & Scinto

(57) ABSTRACT

A process is disclosed for applying an audio-visual addressing scheme to locate fragments of audio-visual content. The process comprises a definition sub-process, an encoding sub-process, and a decoding sub-process. The definition sub-process defines a logical model for a class of audio-visual media. The logical model is used in the encoding sub-process for encoding an address for an audio-visual resource fragment belonging to the class of audio-visual media. The logical model is also used for locating the audio-visual resource fragment that is associated with the address.

37 Claims, 14 Drawing Sheets

FOREIGN PATENT DOCUMENTS

WO        WO 99/41684        8/1999

OTHER PUBLICATIONS

Bugaj, Stephan, et al.; "Synchronized Multimedia Integration Language" XP-002275957, W3C Working Draft Feb. 2, 1998, from website <http://www.w3.org/TR/1998/WD-smil-0202>, retreived Apr. 2, 2004.

McDysan, David E., et al., "ATM: Theory and Application," ISDN/ATM Standards, Basics, Protocol, and Structure, (McGraw-Hill, Inc. 1995).

\* cited by examiner

METHOD AND SYSTEM FOR ADDRESSING AUDIO-VISUAL CONTENT FRAGMENTS

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to retrieval of data from data bases, and in particular, to retrieval of audio-visual data.

BACKGROUND ART

The advent of technology providing mass-market access to the Internet places vast amounts of on-line information within relatively easy reach. The World Wide Web (WWW) (hereunder, the Web) underpins much of the growth of Internet use, particularly because of the ease of use, and also due to the intuitive user interface presented by Web browsers Universal Resource Indicators (URIs) are a ubiquitous addressing feature used to locate target resources in the Web context. This is particularly relevant when Web pages are used in conjunction with a Common Gateway Interface (CGI) scripting application, which allows the Web page to become, in essence, the front end of a myriad of databases accessible over the Internet.

Notwithstanding the explosive progress described however, a Web user is, in most cases, unable to "drill down" beyond a certain level of data, and must, in many cases, down-load an inconveniently large and cumbersome amount of information in order to locate useful information. Illustrating this fact, consider investigating all flights from London to Moscow departing from Heathrow airport on a given date. In order to make a selection based on a number of criteria such as departure time, airline, number of stops and so on, a long list of flights typically needs to be down-loaded and scanned, either manually or using a back-end application on a local personal computer (PC).

Further exemplifying the problem, certain types of data such as, for example, audio-visual (AV) data, typically manifest themselves as monolithic blocks of information. The internal structure of such data, whether it be a particular video segment, or fragment, in a movie, or a specific movement in a symphony, is neither visible, nor addressible, or consequently accessible in terms of fragments.

Taking a more extreme example, off-line audio-visual data, in the form of celluloid film archives, paper-based libraries, and a wealth of other sources, are also not addressable, and are thus invisible and inaccessible at the "fragment" level. Although particular books can be located, by call number and location in a library, specific chapters thereof are not visible or addressable, and consequently, not accessible.

Extensible Markup Language (XML) provides a drill down capability for a limited sub-set of on-line information, namely information which is coded in XML However, useful as this may be, the overwhelming bulk of available information has been produced in other programming formats such as Hypertext Markup Language (HTML), or alternatively, is in hard copy form in physical archives and libraries. The aforementioned types of information are referred to as "legacy" information.

It is an object of the present invention to substantially overcome, or at least ameliorate, one or more disadvantages of existing arrangements.

DISCLOSURE OF THE INVENTION

It is an object of the present invention to substantially overcome, or at least ameliorate, one or more disadvantages of existing arrangements.

According to a first aspect of the invention, there is provided a method for addressing an AV fragment of an AV resource over a network, to an arbitrary level of resolution, said AV resource being a member of a class of AV resources, wherein a logical model is associated with members of the class of AV resources; said method comprising steps of:

determining a URI network address for the AV resource;

applying the logical model to the AV resource to form a hierarchical representation of the AV resource including a representation of the AV fragment;

determining a fragment identifier for the fragment dependent upon the representation of the AV fragment; and combining the URI network address and the fragment identifier to form a URI reference, being an address for the AV fragment.

According to a further aspect of the invention, there is provided a method for locating an AV fragment of an AV resource over a network, to an arbitrary level of resolution, said AV resource being a member of a class of AV resources, wherein a logical model is associated with members of the class of AV resources; said method comprising steps of:

using a URI network address portion of a URI reference to locate the AV resource;

identifying (i) a type of the AV resource, and (ii) the logical model, dependent upon one of (a) the fragment identifier, (b) the URI, and (c) the fragment identifier and the URI; and applying an XPath based addressing scheme to the fragment identifier, said scheme including at least one of a time axis, a time function, a region axis, and a region function, for addressing temporal and spatial fragments of the AV resource, thereby locating the AV fragment.

According to a further aspect of the invention, there is provided a method for addressing an AV fragment of an AV resource over a network, to an arbitrary level of resolution, said AV resource being a member of a class of AV resources, wherein a logical model is associated with members of the class of AV resources; said method comprising steps of:

determining a URI network address for the AV resource;

applying the logical model to the AV resource to form a hierarchical representation of the AV resource including a representation of the AV fragment;

determining a fragment identifier for the fragment dependent upon the representation of the AV fragment, including a sub-step of identifying (i) a type of the AV resource, and (ii) the logical model, dependent upon one of (a) the fragment identifier, (b) the URI, and (iii) the fragment identifier and the URI; wherein said identifying step comprises a sub-step of applying an XPath based addressing scheme to the fragment identifier, said scheme including at least one of a time axis, a time function, a region axis, and a region function, for addressing temporal and spatial fragments of the AV resource; and combining the URI network address and the fragment identifier to form a URI reference, being an address for the AV fragment.

According to a further aspect of the invention, there is provided an apparatus for addressing an AV fragment of an AV resource over a network, to an arbitrary level of resolution, said AV resource being a member of a class of AV resources, wherein a logical model is associated with members of the class of AV resources; said apparatus comprising:

first determining means for determining a URI network address for the AV resource;

applying means for applying the logical model to the AV resource to form a hierarchical representation of the AV resource including a representation of the AV fragment;

second determining means for determining a fragment identifier for the AV fragment dependent upon the representation of the AV fragment; and combining means for combining the URI network address and the fragment identifier to form a URI reference, being an address for the AV fragment.

According to a further aspect of the invention, there is provided an apparatus for addressing an AV fragment of an AV resource over a network, to an arbitrary level of resolution, said AV resource being a member of a class of AV resources, wherein a logical model is associated with members of the class of AV resources; said apparatus comprising:

first determining means for determining a URI network address for the AV resource;

first applying means for applying the logical model to the AV resource to form a hierarchical representation of the AV resource including a representation of the AV fragment;

second determining means for determining a fragment identifier for the fragment dependent upon the representation of the AV fragment, including identifying means for identifying (i) a type of the AV resource, and (ii) the logical model, dependent upon one of (a) the fragment identifier, (b) the URI, and (iii) the fragment identifier and the URI; wherein said identifying means comprises second applying means for applying an XPath based addressing scheme to the fragment identifier, said scheme including at least one of a time axis, a time function, a region axis, and a region function, for addressing temporal and spatial fragments of the AV resource; and combining means for combining the URI network address and the fragment identifier to form a URI reference, being an address for the AV fragment.

According to a further aspect of the invention, there is provided an apparatus for locating an AV fragment of an AV resource over a network, to an arbitrary level of resolution, said AV resource being a member of a class of AV resources, wherein a logical model is associated with members of the class of AV resources, said apparatus comprising utilisation means for using a URI network address portion of a URI reference to locate the AV resource;

identifying means for identifying (i) a type of the AV resource, and (ii) the logical model, dependent upon one of (a) the fragment identifier, (b) the URI, and (c) the fragment identifier and the URI; and applying means for applying an XPath based addressing scheme to the fragment identifier, said scheme including at least one of a time axis, a time function, a region axis, and a region function, for addressing temporal and spatial fragments of the AV resource, thereby locating the AV fragment.

According to a further aspect of the invention, there is provided a computer readable memory medium for storing a program for apparatus for addressing an AV fragment of an AV resource over a network to an arbitrary level of resolution, said AV resource being a member of a class of AV resources, wherein a logical model is associated with members of the class of AV resources; said program comprising:

code for a first determining step for determining a URI network address for the AV resource;

code for an applying step for applying the logical model to the AV resource to form a hierarchical representation of the AV resource including a representation of the AV fragment;

code for a second determining step for determining a fragment identifier for the AV fragment dependent upon the representation of the AV fragment; and code for a combining step for combining the URI network address and the fragment identifier to form a URI reference.

According to a further aspect of the invention, there is provided a computer readable memory medium for storing a program for apparatus for addressing an AV fragment of an AV resource over a network, to an arbitrary level of resolution, said AV resource being a member of a class of AV resources, wherein a logical model is associated with members of the class of AV resources; said program comprising:

code for a first determining step for determining a URI network address for the AV resource;

code for a first applying step for applying the logical model to the AV resource to form a hierarchical representation of the AV resource including a representation of the AV fragment;

code for a second determining step for determining a fragment identifier for the fragment dependent upon the representation of the AV fragment, including code for an identifying step for identifying (i) a type of the AV resource, and (ii) the logical model, dependent upon one of (a) the fragment identifier, (b) the URI, and (iii) the fragment identifier and the URI; wherein said code for the identifying step comprises code for a second applying step for applying an XPath based addressing scheme to the fragment identifier, said scheme including at least one of a time-axis, a time function, a region axis, and a region function, for addressing temporal and spatial fragments of the AV resource; and code for a combining step for combining the URI network address and the fragment identifier to form a URI reference, being an address for the AV fragment.

According to a further aspect of the invention, there is provided a computer readable memory medium for storing a program for apparatus for locating an AV fragment of an AV resource over a network, to an arbitrary level of resolution, said AV resource being a member of a class of AV resources, wherein a logical model is associated with members of the class of AV resources; said program comprising:

code for a utilisation step for using a URI network address portion of a URI reference to locate the AV resource;

code for an identifying step for identifying (i) a type of the AV resource, and (ii) the logical model, dependent upon one of (a) the fragment identifier, (b) the URI, and (c) the fragment identifier and the URI; and code for an applying step for applying an XPath based addressing scheme to the fragment identifier, said scheme including at least one of a time axis, a time function, a region axis, and a region function, for addressing temporal and spatial fragments of the AV resource, thereby locating the AV fragment.

BRIEF DESCRIPTION OF THE DRAWINGS

Various aspects of the prior art, and a preferred embodiment of the present invention will now be described with reference to the drawings, in which.

DETAILED DESCRIPTION INCLUDING BEST MODE

Figure 1:
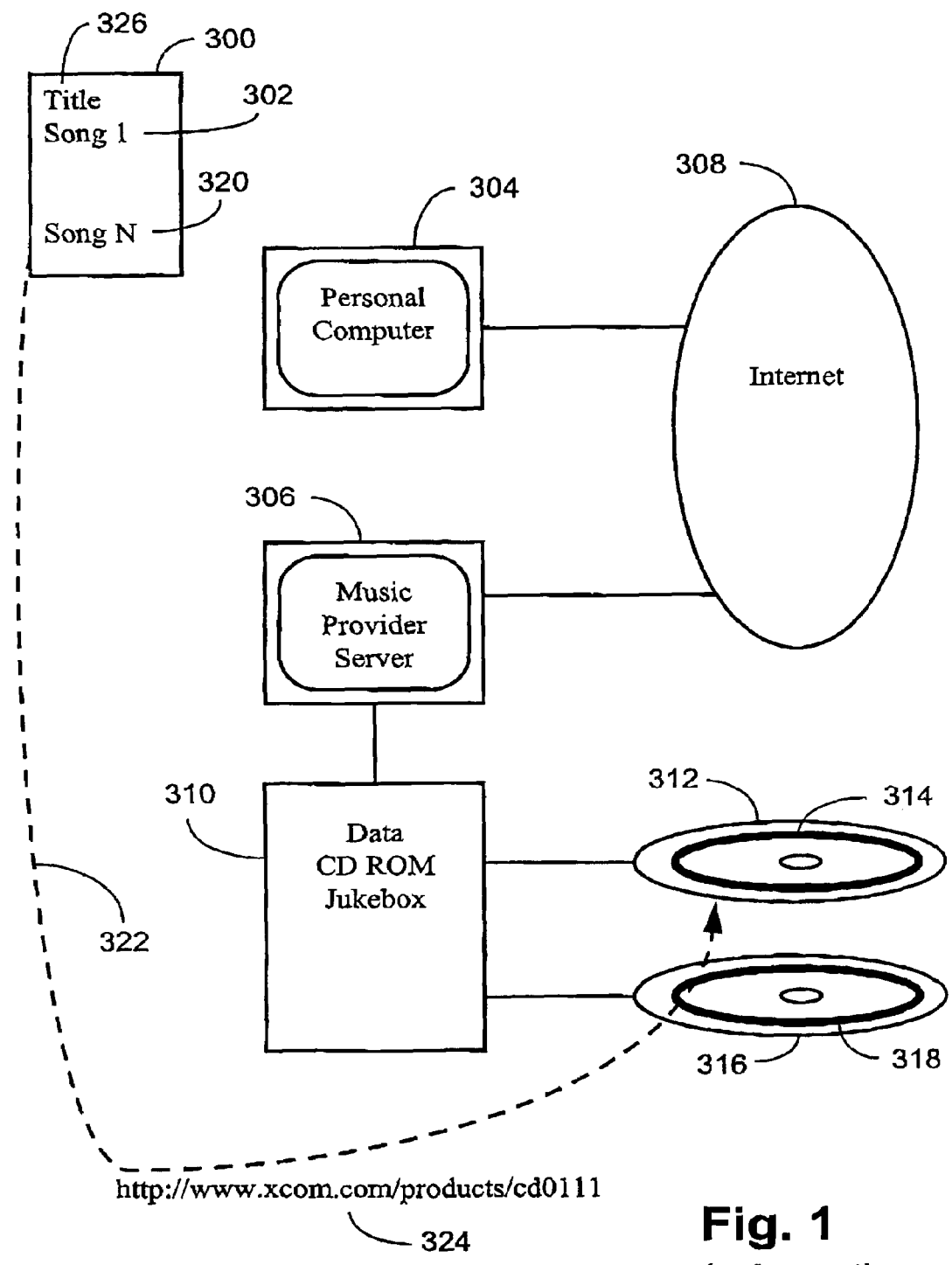
FIG. 1 depicts a prior art system for accessing audio data on a CD ROM using the Internet.

Where reference is made in any one or more of the accompanying drawings to steps and/or features, which have the same reference numerals, those steps and/or features have for the purposes of this description the same function(s) or operation(s), unless the contrary intention appears.

It is noted that the introductory part of the description makes reference, for illustrative purposes, to audio and video content which is stored on Compact Disk Read Only Memory (CD ROM) media accessed by a "Juke Box" device which is capable of storing a number of such disks and accessing them according to an address.

FIG. 1 depicts a prior art system used to locate an audio content CD ROM 312 using the Internet 308 as a vehicle. A user (not shown) uses a personal computer (PC) 304 which is connected to the Internet 308 in order to connect to the server 306 of an on-line music provider. The server 306 is connected to a CD ROM juke box 310 which houses a plurality of CD ROMs 312, 316. Each CD ROM 312, 316 contains individual songs exemplified, for illustrative purposes only, by bold lines 314, 318 respectively. The user has a paper description 300 of the desired CD ROM 312 containing a title 326 of the CD ROM, and also a list of the songs 302, 320. The user uses a Universal Resource Indicator (URI) 324 which "points" to the address of the CD ROM 312, and the user is able to download music from the CD ROM 312 over the system.

Figure 2:
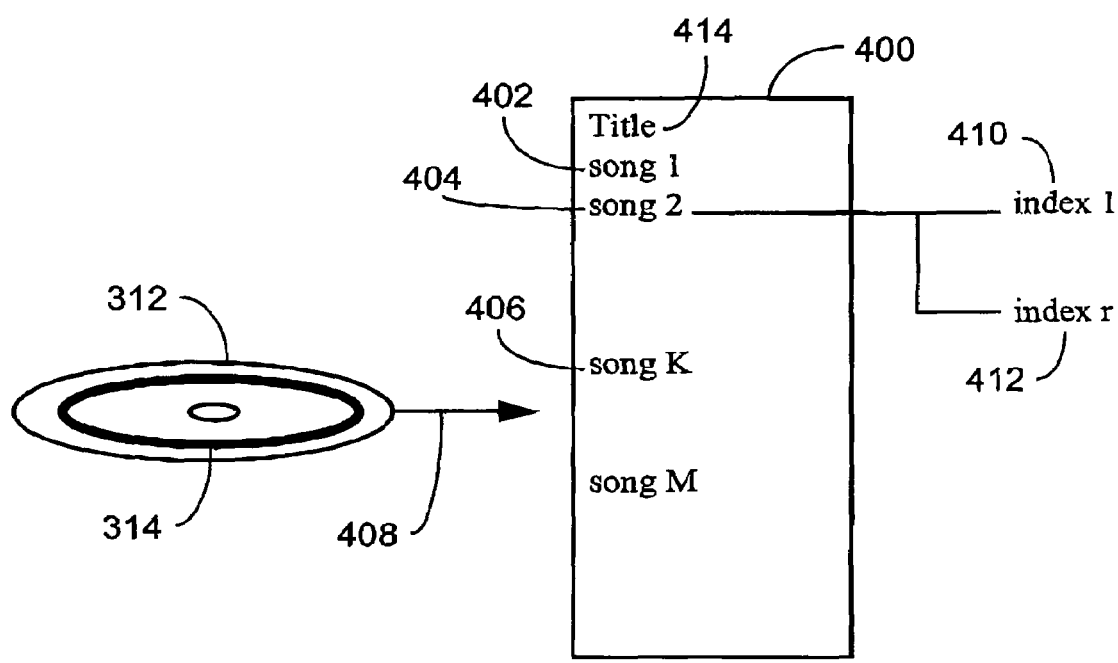
FIG. 2 illustrates indexing typically provided for a CD ROM according to FIG. 1.

In FIG. 2, the CD ROM 312 can be portrayed in a description 400 as containing a list of songs 402, 404 under a title 414, where the song 404 has indices 410 and 412 which point to particular segments within the song 404. Terminology such as "songs" is used for illustration in this part of the description, noting that in fact, as described, the audio content is actually stored on CD ROM as noted. For example in classical music where the "song" 402 can be an individual movement of a symphony, and therefore can be quite long, the index 1 (ie 410) can point to a trumpet solo, and the index r (ie 412) can point to a violin solo of interest. Depending upon the capabilities of the server 306 and juke box 310 in FIG. 1, the user can address the desired CD ROM 312, and address a desired index 410. It is noted however, with reference to both FIG. 1, and to FIG. 2, that the user is limited to addressing, and so accessing, material only down to the level of the articular CD (ie 312), or perhaps the specified predefined index (ie 410). It is not possible to "drill down" to an arbitrary further specified level of fine grain detail.

Figure 3:
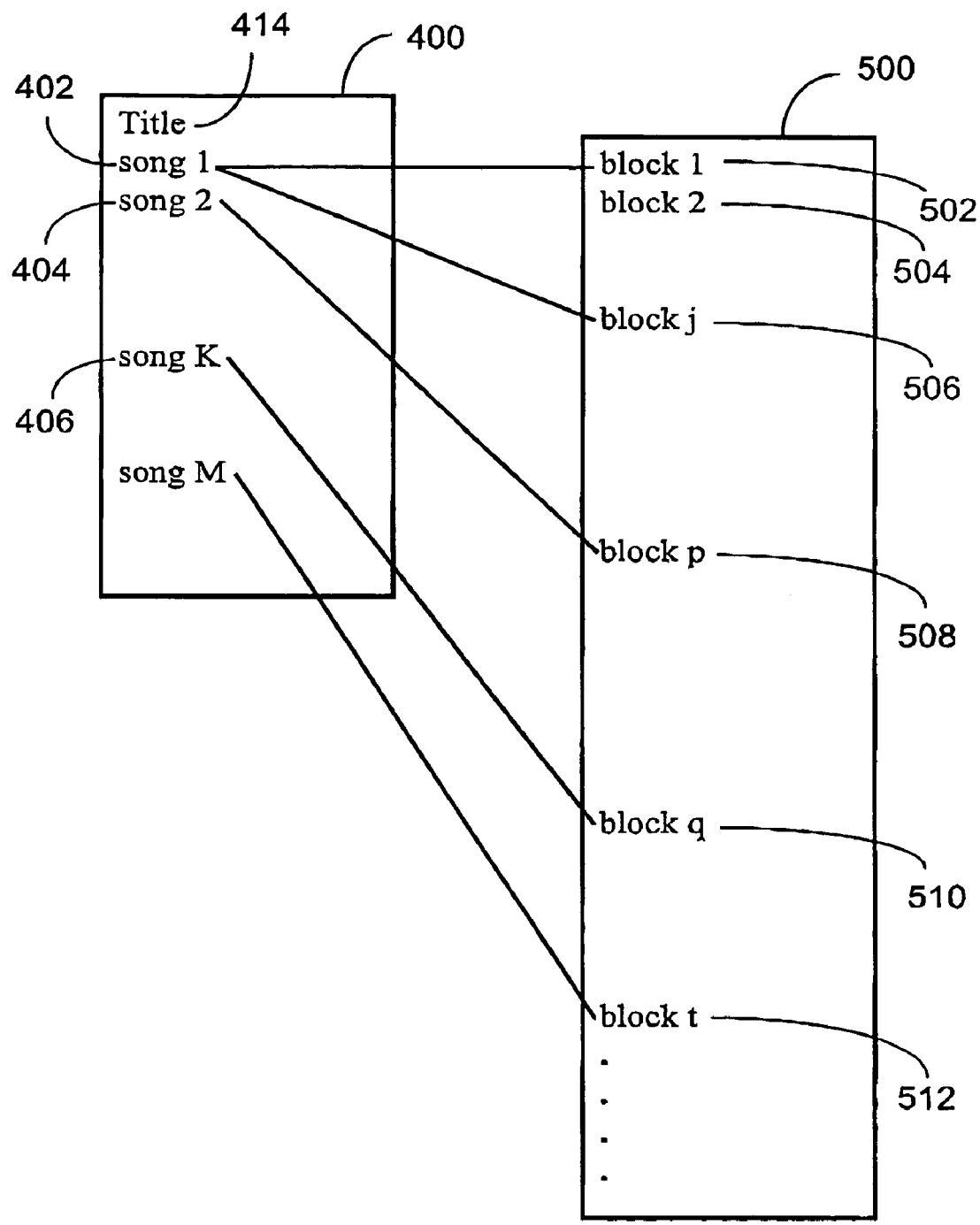
FIG. 3 depicts a preferred embodiment of the addressing method in relation to CD ROMs according to the present invention.

FIG. 3 depicts an illustrative embodiment of an addressing method, in this case to be used in relation to audio, CD ROMs. The CD ROM 312, formerly described by the description 400 which contains a list of individual songs 402, each of which may contain a level of indexing (eg 410 see FIG. 2) is extended, using a logical model based upon consecutive time blocks or slices, and using a set of rules defining how the logical model is to be applied, into a hierarchical representation comprising both the description 400 and the further description 500 comprising time blocks 502 to 512. The logical model, when applied to the CD ROM 312, serves to form a hierarchical representation of the otherwise monolithic AV content of the CD ROM 312. The model thereby enables systematic and rapid addressing of arbitrary content fragments on a time block basis, and provides the desired arbitrary drill down capability. Using the described representation, a user is able, for example, to select an arbitrary fragment of audio content on the CD ROM 312 by specifying a fragment address, or fragment identifier, of the form "title/song1/block 2-block j-3", where j is an arbitrary index as shown in FIG. 3. The present logical model is used for illustrative purposes, and more advantageous logical models and addressing schemes are proposed later in the description. In FIG. 3 song 402 is shown to comprise blocks 502 to 506, song 2 comprising blocks from the block after 504 through to block 506 and so on.

Figure 4:
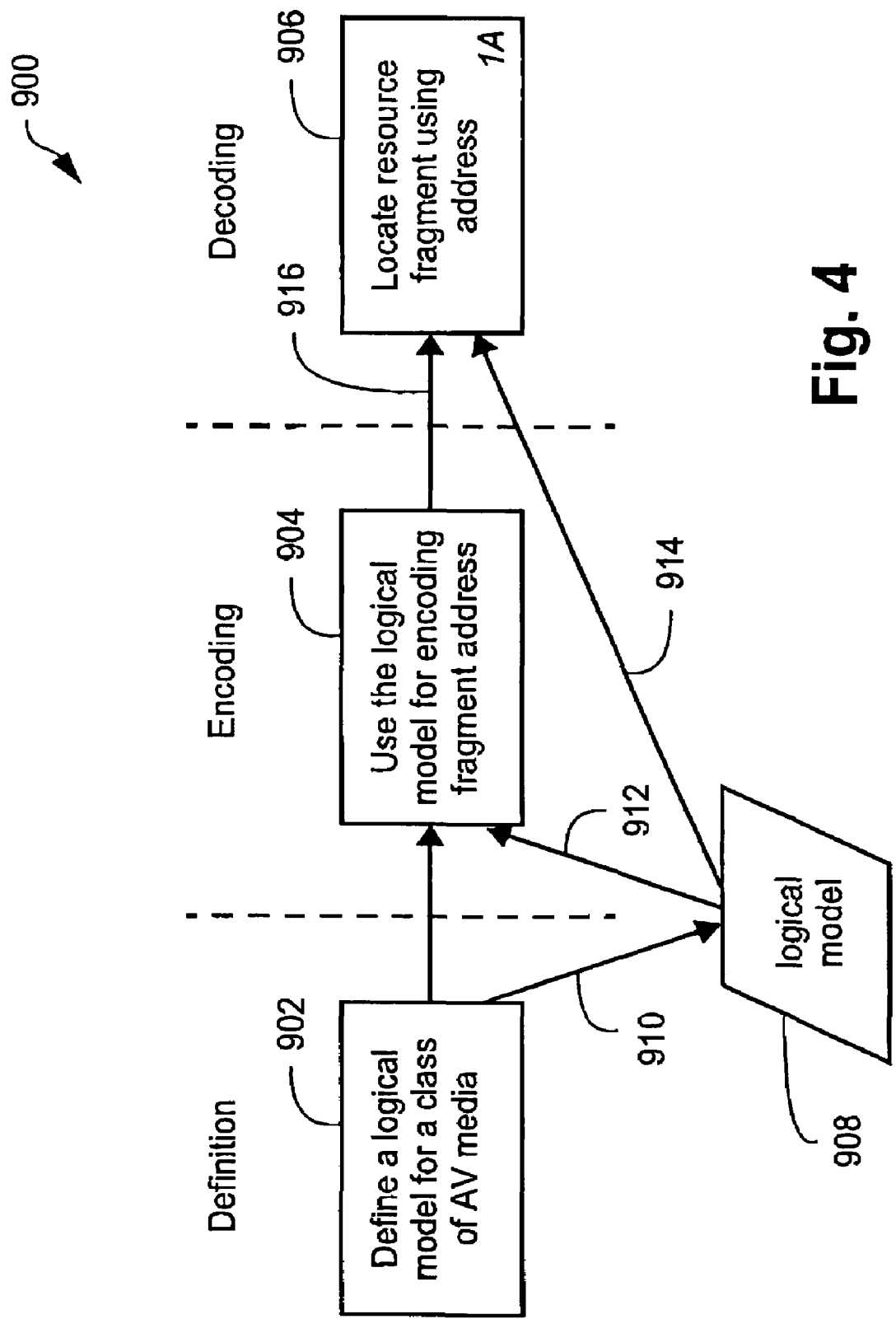
FIG. 4 shows a process for applying an audio-visual addressing scheme to locate fragments of audio-visual content.

FIG. 4 shows a process 900 for applying an audio-visual (ie AV) addressing scheme to locate fragments of audio-visual content. The process 900 comprises three sub-processes, namely a definition sub-process 902, an encoding sub-process 904, and a decoding sub-process 906. The definition sub-process 902 defines, as depicted by an arrow 910, a logical model 908 for a class of AV media. After the definition sub-process 902, the logical model 908 is used (as depicted by an arrow 912) in the encoding sub-process 904 for encoding an address for an audio-visual resource fragment belonging to the class of AV media. The logical model 908 is also used (as depicted by an arrow 914) for locating the audio-visual resource fragment that is associated with the address.

Figure 5:
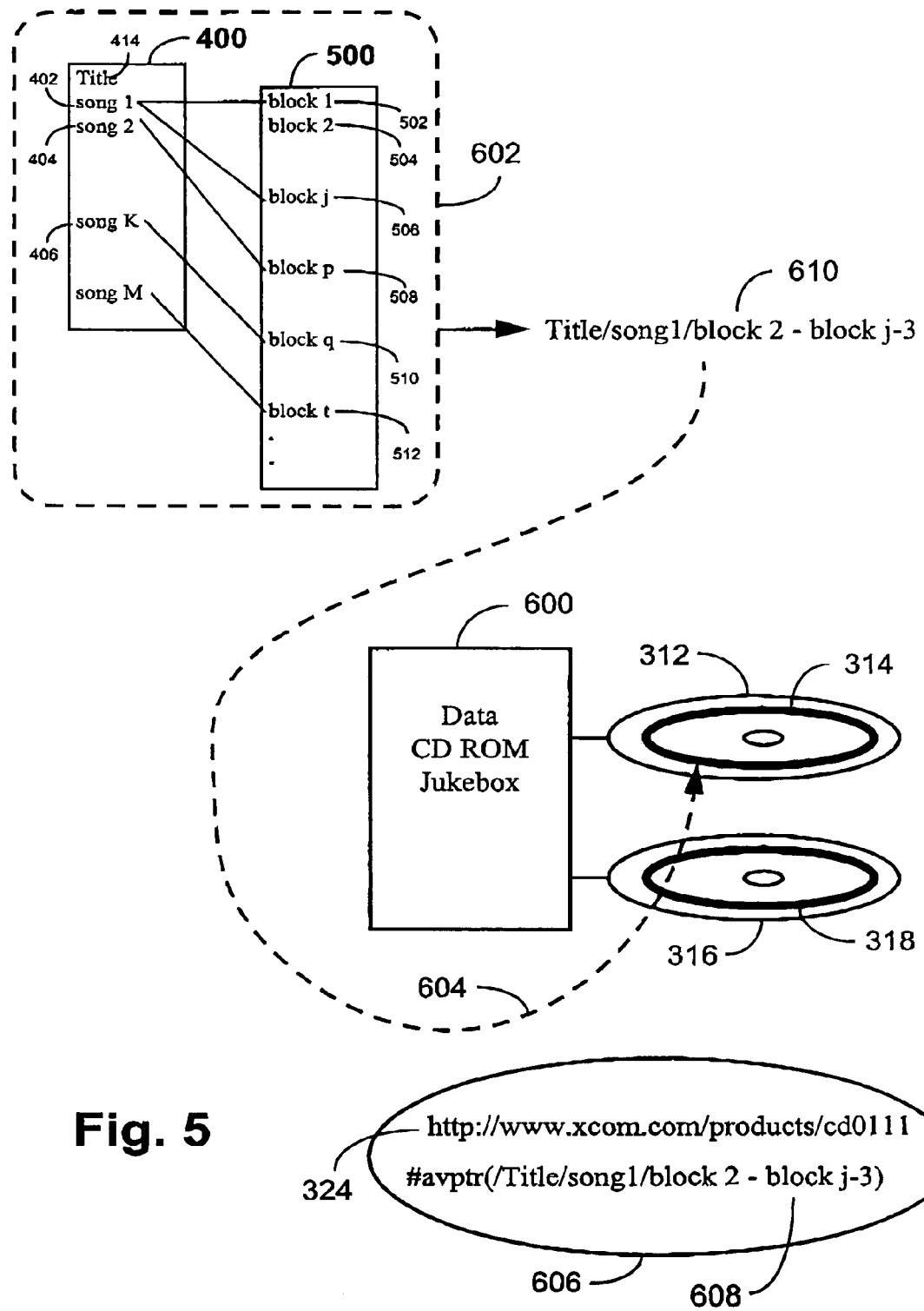
FIG. 5 illustrates application of the method in FIG. 3 to addressing a fragment of audio data on a CD ROM.

Turning to FIG. 5, the hierarchical representation 602, comprising descriptions 400 and 500, is shown in a system content in more detail. By using the fragment identifier 610, derived from the hierarchical representation 602, in conjunction with the URI 324 (see FIG. 1), an extended URI 606 (commonly referred to as a "URI reference" is shown to incorporate both the URI 324 described in relation to FIG. 1, and an additional fragment identifier 608. The URI reference can thus be used as an address to the CD 312, and further, to the desired fragment 314.

Figure 6:
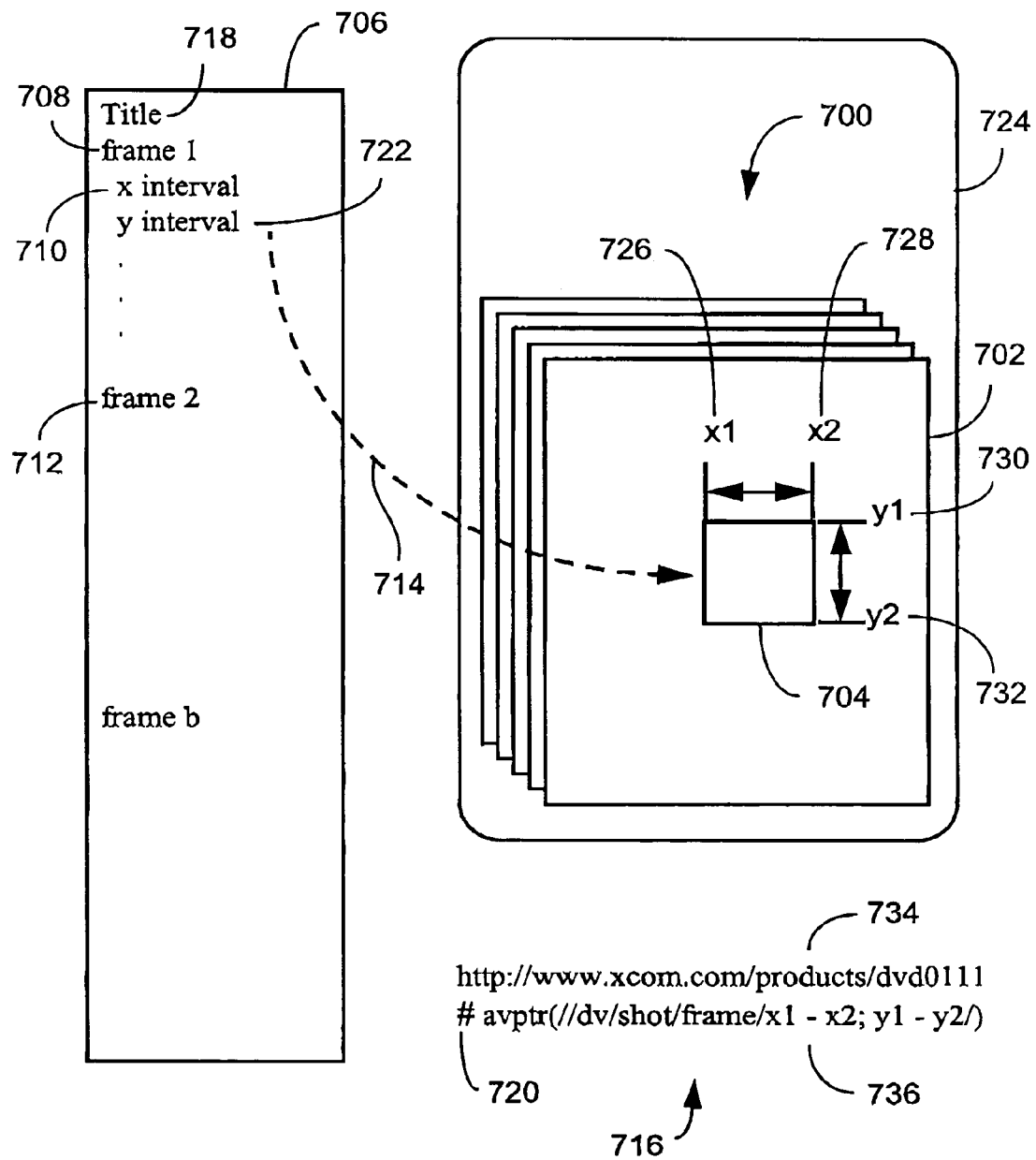
FIG. 6 depicts the preferred embodiment applied to addressing a fragment of digital video content on a CD ROM.

FIG. 6 depicts another hierarchical representation 706, determined using a logical model appropriate for digital video. In this example, a sequence of digital video shots 700 is recorded on a CD ROM 724. The logical model selected resolves the video sequence 700 into frames eg 708, each frame being further resolved into x intervals eg 710 and y intervals eg 722. This logical model is used for illustrative purposes, and more advantageous logical models are proposed later in the description. Using the described representation, a user is able, for example, to select an arbitrary spatial fragment of video content on a specified frame of the CD ROM 724 by specifying a fragment address, or fragment identifier, of the form "Title/frame1/x1-x2; y1-y2". The x interval from x1 (726) to x2 (728) and the y interval from y1 (730) to y2 (732) address the spatial region 704 within the frame 702 in the set of digital video shots 700. The URI reference 716 therefore contains a portion 734 prior to the hash sign 720 which addresses the digital video disc 724, while the portion 736 after the hash sign 720 addresses the fragment 704.

Having provided an illustrative description of an embodiment of the invention, a more detailed description is now provided. ML is utilised as a basis for describing a preferred embodiment of the present invention. This is both from the standpoint of conceptual and notational convenience, and also because XML has significant support as a recommendation in the context of the World Wide Web Consortium ($W^3C$).

It is shown, in the preferred embodiment, how the XML Path Language (XPath), can be extended and used in an unexpected manner in order to locate fragments of non XML-based audio-visual content.

The XML Linking Language (Xlink) uses URI's for locating objects. In principle, modified URIs can be used for locating any resource that has identity, for instance, an electronic document, an image, a service, a collection of other resources, a person, an corporation, or a bound book in a library. Each resource corresponds to an entity or set of entities in a conceptual model. URI's can therefore be used for locating or referencing resources other than XML documents. However, the XPath and XML Pointer Language (Xpointer) schemes that XLink currently uses for addressing the internal structure of data objects can only be used to locate fragments of XML documents.

As an introduction, the use of XLink, XPointer, and XPath, are considered in the limited context of XML documents. XPath models an XML document as a tree of nodes. There are seven types of nodes, namely root nodes, element nodes, text nodes, attribute nodes, namespace nodes, processing instruction nodes and comment nodes. XPath uses a compact, non-XML syntax to facilitate the use of XPath within URI's. An XPath location path consists of a '/'-separated list of location steps. Each location step has the form:

axis :: node-test [predicates]

where axis specifies the tree relationship between the nodes selected by the location step and the context node; node-test specifies the node type or the name; and predicates refine the set of nodes selected by the location step.

A number of syntactic abbreviations allow common cases to be expressed concisely as follows.

@ is short for attribute::, e.g. attribute::type can be abbreviated as @type,

// is short for /descendant-or-self::node( )/,

. is short for self::node( ), and

.. is short for parent::node( ).

An axis specifies the tree relationship between the nodes selected by the location step and the context node. XPath axes include child, parent, descendant, ancestor, following-sibling, preceding-sibling, following, preceding, attribute, namespace, self, descendant-or-self and ancestor-or-self. The default is the child axis. XPointer extends XPath adding the string and range axes.

A node test specifies the node type or the name (such as the name of an element or an attribute) of the nodes selected by the location step.

There can be zero or more predicates for refining the set of nodes selected by the location step. Predicates are evaluated for each candidate location along the specified axis, and typically test the element type, attributes, positions, and/or other properties of the candidate nodes.

A function library provides a set of predicate functions such as count( ), position( ), id( ), last( ), etc. Each function takes zero or more arguments and returns a single result. Like XPointer, a new scheme can define new functions to extend the core functions of XPath.

Each location step is evaluated with respect to a context. The context is initially the document root, or more generally the results of a prior location step. The node set selected by the location step is the node set that results from generating an initial node set from the axis and node test, and then filtering that node-set by each of the predicates in turn.

Some examples of XPath location paths are as follows:

/doc/chapter[2]/section[3]

selects the third section of the second chapter of doc chapter[contains(string(title), "Overview"]

selects the chapter children of the context node that have one or more title children containing the text "Overview"

child::*[self::appendix or self::index]

selects the appendix and index children of the context node child::*[self::chapter or self::appendix] [position( )=first( )]

selects the first chapter and appendix children of the context node para[@type="warning"]

selects all para children of the context node that have a type attribute with value "warning"

para[@id]

selects all the para children of the context node that have an id attribute.

XPath operates on the logical structure of an XML document, this logical structure being defined either explicitly by a Document Type Definition (DTD), or implicitly by arrangement of tags. For instance, the examples given in the previous section assumed an XML document with the structure, in Extended Backus-Naur Form (ENBF) as follows:

doc ::= toc chapter+ appendix* index chapter ::= section+ section ::= para+ appendix ::= section+ where "toc" means "table of contents", "+" means "one or more, "*" means zero or more", and the composite description presented above describes, in expanded form, a document comprising a table of contents, one or more chapters, zero or more appendices, and an index, where each chapter comprises one or more sections, where each section comprises one or more paragraphs, and finally where each appendix comprises one or more sections.

In an XML document, each of these structures is marked by a pair of appropriately named tags. The tag markup allows the logical structure of the document to be determined unambiguously. Hence, any application that understands the syntax of XML can determine the location of the document's components. Any application that understands the XPath and XPointer notations can use an URI with an XPath/XPointer fragment identifier to locate parts of the document.

Audio-visual, or AV content, is not stored as XML documents and cannot be marked up. However, given an unambiguous logical structure, or model, a modified XPath location/addressing method can be used. Hence, for each class of AV content, in the first instance, an unambiguous logical structure must be defined, and in order to make it widely accessible, the logical structure should preferably be published. By an unambiguous logical structure or model, it is meant that different persons and applications will segment given content in exactly the same way given the model.

Considering one type of AV content, for instance, Digital Video format as used by digital video cameras, this can be modelled as:

dv ::= frame* where this means a digital video comprising one or more frames.

In the case, for example, where compatible digital video cameras generate meta-data to represent and record the instances the camera starts recording (designated a REC event), a shot can be defined as an interval between two REC event. In this case, the model for DV format is:

dv ::= shot* shot ::= frame+ meaning a digital video comprising zero or more shots, each shot comprising one or more frames.

As another example, the logical structure of Compact Disc Audio can be modelled as follows:

cdAudio ::= track* track ::= channel channel index* channel ::= sample* meaning an audio CD comprising zero or more tracks, each track comprising two channels, and zero or more indices, and each channel comprising zero or more samples.

Considering a more complex example, consider Digital Video Disc, or DVD, video which can provide:

over 2 hours of high-quality digital video (over 8 on a double-sided, dual-layer disc), up to 8 tracks of digital audio, each with as many as 8 channels up to 32 subtitle/karaoke tracks up to 9 camera angles (different viewpoints) can be selected during playback up to 32 separate subpicture channels Other data types include Video Manager Information files, Video Title Set files, Program Chain Information files, still picture Video Objects, attributes for Title, Part_of_Titles, and Menus, Time Map Tables, Part_of_Title Search Pointers, and Navigation Commands.

DVD-Video content is broken into titles and chapters (or parts of titles). Titles are made up of cells linked together by one or more program chains (PGC). Individual cells can be used by more than one PGC. Different PGCs define different sequences through mostly the same material. Additional material for camera angles and branching is interleaved together in small chunks. The DVD player jumps from chunk to chunk, skipping over unused angles or branches, to stitch together the seamless video.

One logical model for DVD-Video is:

dvdVideo ::= mainMenu? title* subpicture* file* mainMenu ::= menu* menu ::= menu* title ::= chapter+ chapter ::= view+ audio+ subtitle* view ::= frame+ audio ::= channel+ channel ::= sample+

The previous logical models each relate to a class of AV content, namely digital video, compact disc audio, and digital video disk. As noted, the application of the logical models to the associated AV content produces hierarchical representations of the AV content which supports addressing of fragments of the content.

Turning to the aspect of addressing, each location step is evaluated with respect to a context. The context is initially the root node, dvdVideo in this case. In general, the context is the results of a prior location step. The node set selected by the location step is the node set that results from generating an initial node set from the axis and node test, and then filtering that node-set by each of the predicates in turn.

Figure 7:
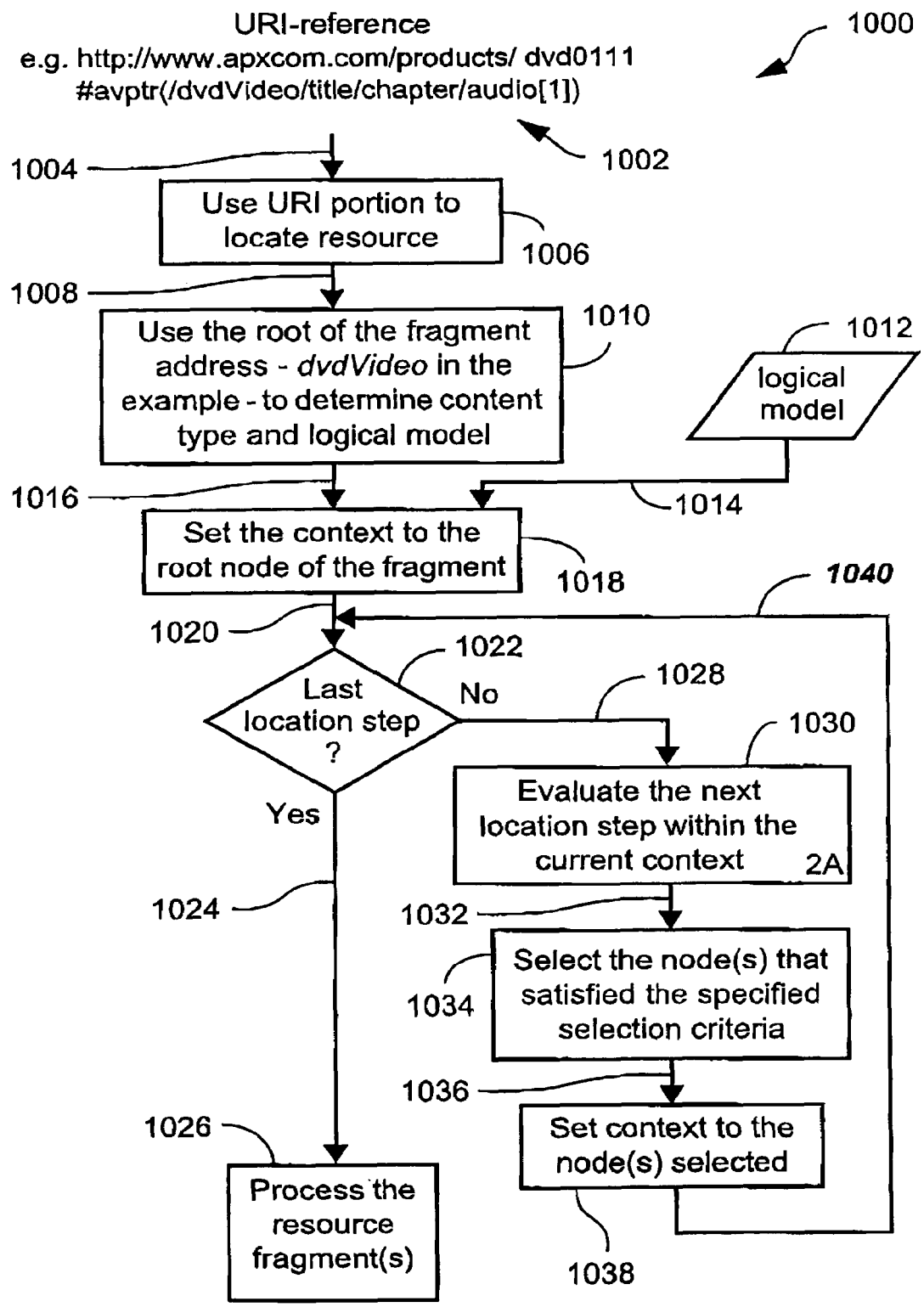
FIG. 7 shows a process for locating audio-visual fragments using the "avptr" addressing scheme.

FIG. 7 shows a process 1000 for locating audio-visual fragments using the "avptr" addressing scheme. This process 1000 depicts the decoding sub-process 906 in FIG. 4. A URI reference 1002 (http://www.apxcom.com/products/dvd0111#avptr(/dvdVideo/title/chapter/audio[1])) is provided, as depicted by an arrow 1004 which is equivalent to an arrow 916 in FIG. 4, to a step 1006. In the step 1006, the URI portion (http://www.apxcom.com/products/dvd011) of the URI reference 1002 is used to locate a resource. In a following step 1010, a root of the fragment address, ie dvdVideo in the URI reference 1002, is used to determine a content type, and consequently, an associated logical model 1012 (which has already been defined in the definition sub-process 902 in FIG. 4). In a following step 1018, the logical model 1012 (which is equivalent to the logical model 908 in FIG. 4) is used to set the initial context to the root node of the fragment.

Thereafter, a decision step 1022 determines whether the aforementioned steps have determined the last location step required to locate the desired resource fragment. If the last location step has been determined, the process 1000 is directed, according to a "YES" arrow 1024, to a step 1026 in which the located resource fragment is processed. The step 1026 is a post-location processing step.

If the decision step 1022 determines that the last location step has not been determined, then the process 1000 is directed, according to a "NO" arrow 1028, to a step 1030 which evaluates the next location step within the current context. This is described in more detail with reference to FIG. 8. Thereafter, in a step 1034, node(s) are selected that satisfy the specified selection criteria (see FIG. 8 for description of these criteria). In a following step 1038, the context is set to the node(s) selected, and the process 1000 is then directed, according to an arrow 1040, to the testing step 1022.

Figure 8:
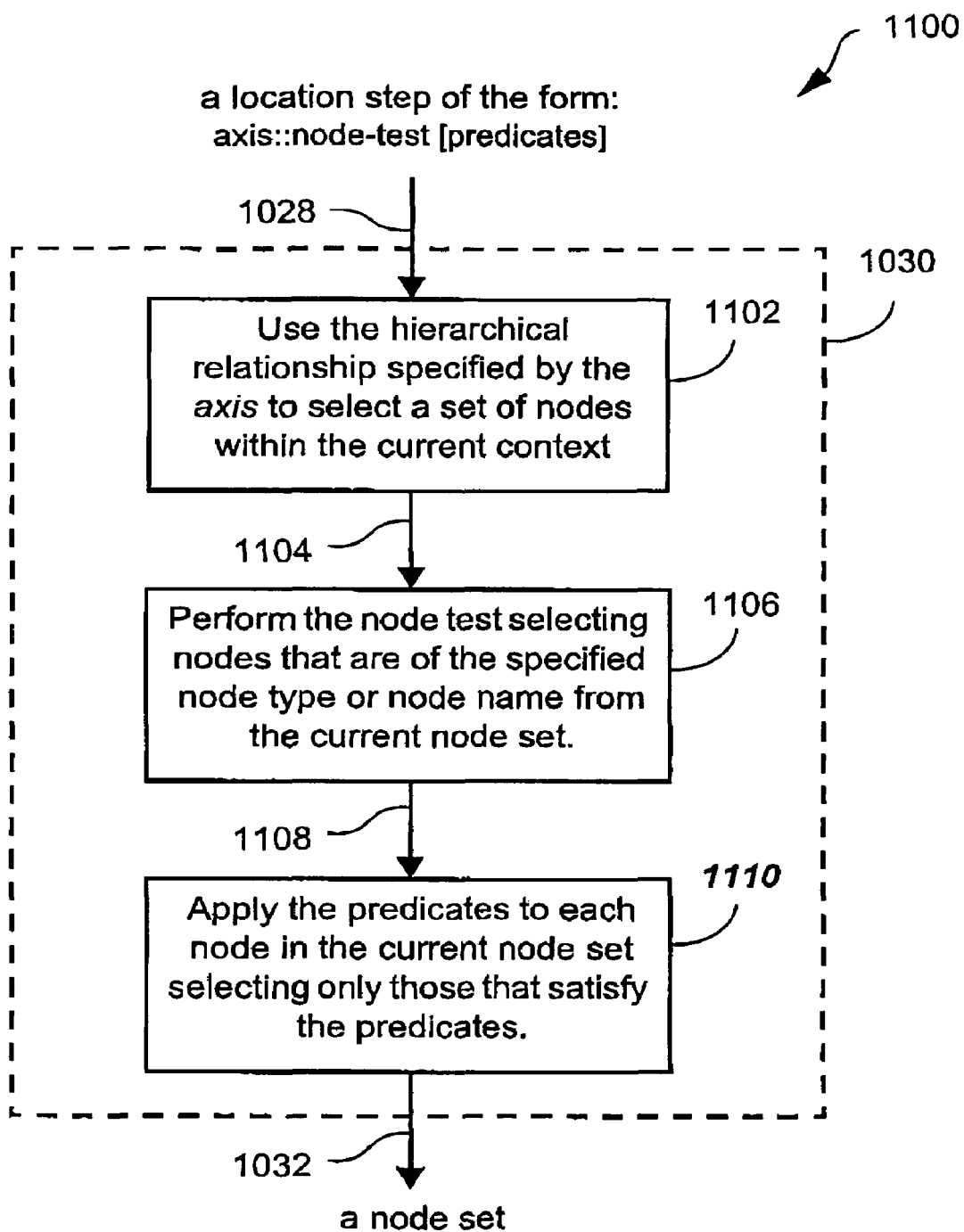
FIG. 8 shows a process for evaluating a location step in FIG. 7.

FIG. 8 shows a process 1100 for evaluating the "evaluation of a location" step 1030, which is shown as a dashed box. The dashed box 1030 in FIG. 8 corresponds to the sub-process 1030 in FIG. 7. The step 1030 is a location step of the form axis::node-test[predicates]. In a first step 1102 (which follows the decision step 1022 in FIG. 7 as depicted by the arrow 1028), a hierarchical relationship specified by the axis is used to select a set of nodes within the current context. Thereafter, in a step 1106 the node test is performed, thereby selecting nodes that are of the specified node type or node name from the current node set. In a following step 1110, the predicates are applied to each node in the current node set, selecting only those nodes that satisfy the predicates.

The described AV location scheme can, utilising a notation and mechanism similar to those of XPath/XPointer, locate analog and digital AV content within a database, or a plurality of databases.

A set of named functions are defined for the AV location scheme. For instance,

| | |
|---|---|
| time(startTime [, endTime]) | For determining whether the current context is within the specified time. |
| timecode(startTimecode [, endTimecode]) | For determining whether the current context is within the time specified by the start and end timecodes. |

The functions can be used for evaluating expressions, the evaluation always occurring with respect to the current context.

In addition, new axes can be added, for instance, a time axis and a region axis for locating temporal and spatial segments of the data. The incorporation of these axes provides additional power to the concept of fragment addressing, and allows drilling down to different aspects of the AV content.

The time axis selects, within the current context, components that occur within the specified start and end time. The current context is taken as starting at time zero and progressing continuously through time in normal play time. If the end time is not specified, it is taken to be the same as the start time and the component that occurs at or closest to the specified start time is selected.

TimeLocationStep ::= 'time' '::' StartTime (',' EndTime)?
TimeUnit ::= 'h' | 'm' | 's' | 'ms'
TimeNotation ::= 'end' | ([0-9]+ TimeUnit)
StartTime ::= TimeNotation
EndTime ::= TimeNotation For example, http://www.apxcom.com/products/dvd0111#avptr(/dvdVideo/title[2]/time::0m,15m)   1]

selects the first 15 minutes the second title of the specified DVD. This example is designated example [1].

In example [1], the method works as follows:

| | Selection step | Meaning | Context after the selection step |
|---|---|---|---|
| axis | (default is child::) | all the children of the context node | all the children of the dvdVideo node, that is, all the mainMenu, title, subpicture and file nodes |
| node-test and predicate | Title[2] | any title node whose position is 2 | the 2nd title nodes |
| axis | Time:: | arrange the current selection continuously in time starting at time zero | unchanged |

-continued

| | Selection step | Meaning | Context after the selection step |
|---|---|---|---|
| node-test | 0m,15m | all content inside the time interval 0 min to 15 min | the first 15 minutes of the 2$^{nd}$ title |

Figure 9:
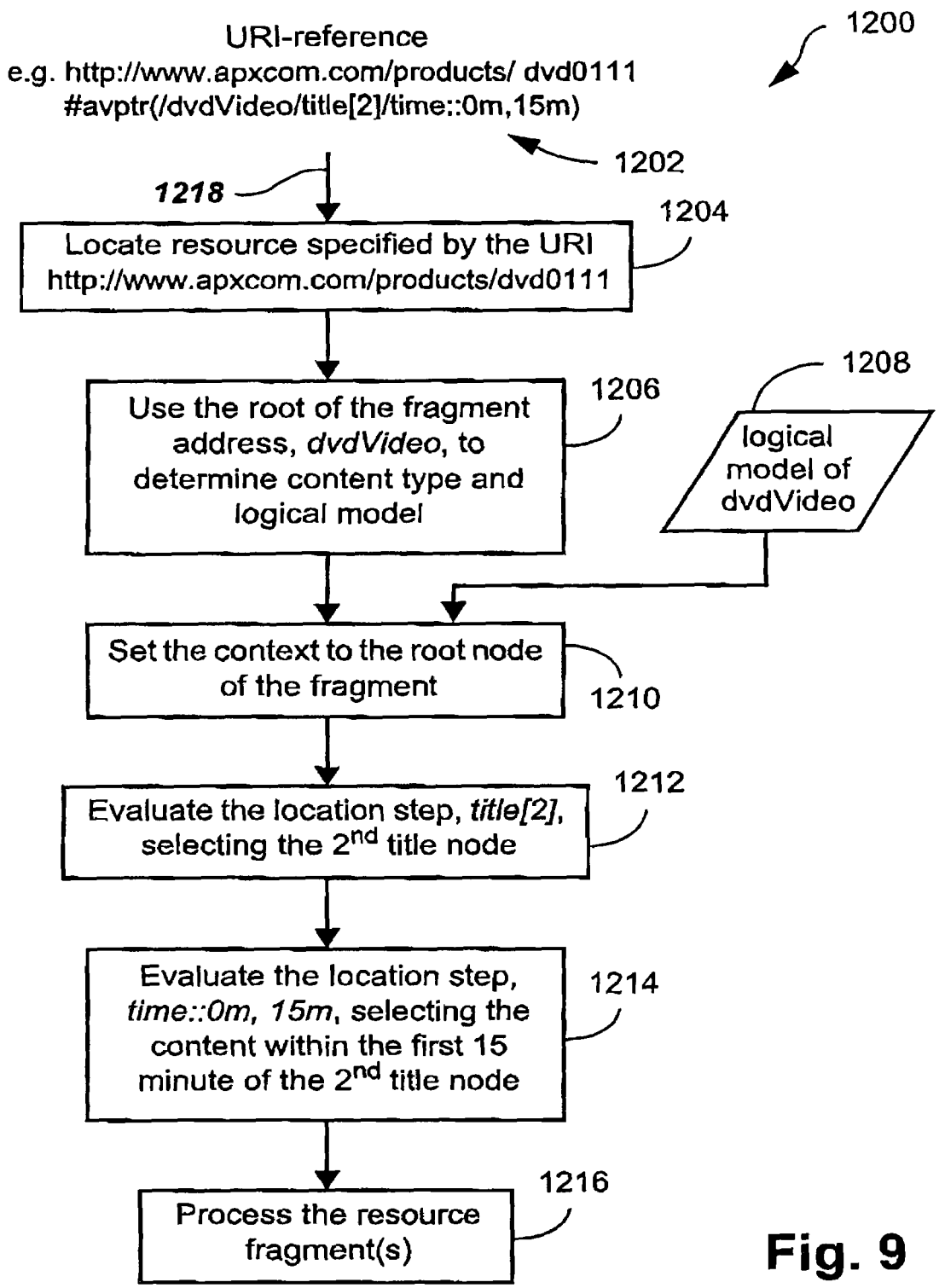
FIG. 9 shows an exemplary process for locating video data on a digital video tape.

FIG. 9 depicts the example [1] as a process 1200 for locating video data on a digital video tape, using the "avptr" addressing scheme. A URI reference 1202 (depicted as [1] in the body of the description) is provided, as depicted by an arrow 1218, to a step 1204 in which the URI portion (ie http://www.apxcom.com/products/dvd0111) of the URI reference 1202 is used to locate a resource. In a following step 1206, the root of the fragment address, ie dvdVideo in the URI reference 1202, is used to determine a content type, and consequently, an associated logical model 1208. In a following step 1210, the logical model 1208 is used to set the initial context to the root node of the fragment.

Thereafter, the process 1200 is directed to a step 1212 which evaluates the location step, ie title[2] in the URI reference 1202, thereby selecting the 2$^{nd}$ title node. Thereafter, in a step 1214, the location step ie time::0m,15m in the URI reference 1202 is evaluated, thereby selecting content within the first 15 minutes of the 2$^{nd}$ title node. Thereafter, the process 1000 is directed to a step 1216 in which the located resource fragment is processed. The step 1216 is a post-location processing step.

In a variation of example [1]:

http://www.apxcom.com/products/dvd0111#avptr(/
dvdVideo/title[(position( )=1 or position( )=2)][time("0m","15m")]   [2]

selects the first 15 minutes of the 1$^{st}$ and the 2$^{nd}$ titles of the specified DVD As another example, http://www.apxcom.com/products/dvd0111#avptr(/
dvdVideo/title[(position( )=1 or position( )=2][time("0m","15m")]   [3]

selects the first 15 minutes of the first and the second titles of the DVD.

The method, applied to example [3], works as follows:

The timecode axis selects, within the current context, components that occur within the specified start and end timecode. If the end timecode is not specified, it is taken to be the same as the start timecode and the component that occurs at the specified start timecode is selected. The timecode is represented by a time value or a combination of date and time values as defined in International Standards Organisation (ISO) 8601. It can also be an SMPTE (ie Society of Motion Picture and Television Engineers) timecode in the format of HH:MM:SS:FF where FF stands for frame.

TimecodeLocationStep ::= 'timecode' '::' StartTimecode (',' EndTimecode)?

TimecodeNotation ::= 'begin' | 'end' | smpteTimecode | time | ('"dateTime"')

StartTimecode ::= TimecodeNotation

EndTimecode ::= TimecodeNotation

For example, http://www.apxcom.com/events/
productLaunch99#avptr (/dv/shot/timecode::00:15:00:00,00:30:00:00)   [4]

selects 15 minutes of clips on the specified digital video tape using SMPTE timecodes The region axis selects, within the current context, the 2D region that is bounded by the specified bounding curve. The origin corresponds to the top-left corner of a frame with the x- and y-axis coordinates increasing to the right and down. Coordinates are specified in (integral) pixel values. Several types of bounding curves such as rectangle and ellipse allow the (anti-clockwise) angle between its major axis and the x-axis to be specified. To allow a region to be specified for different resolutions of the same content, the resolution of the source from which the bounding curve is determined could be specified using the range( ) function.

| | Selection step | Meaning | Context after the selection step |
|---|---|---|---|
| axis | (default is child::) | all the children of the context node | All the children of the dvd Video node, that is, all the mainMenu, title, subpicture and file nodes |
| node-test and predicate | title[position( ) = 1 or position( ) = 2] | any title node whose position is either 1 or 2 | The first and the second title nodes |
| additional predicate | [time("0m","15m")] | any content inside the time interval 0 min to 15 min (of each candidate node) | the first 15 minutes of the first and the second titles |

RegionLocationStep ::= 'region' '::' [Range] BoundingCurve
BoundingCurve ::= Shape
Shape ::= Circle | Ellipse | Rectangle | Polygon | QuadCurve | CubicCurve | Bspline
Circle ::= 'circle(' XCentre ',' YCentre ',' Radius ')'
Ellipse ::= 'ellipse(' XCentre ',' YCentre ',' Major ',' Minor ',' Angle ')'
Rectangle ::= 'rect(' Left ',' Top ',' Width ',' Height ',' Angle ')'
Polygon ::= 'polygon(' Point ',' Point (',' Point)+ ')'
QuadCurve ::= 'qcurve(' Point ',' Point (',' Point)+ ')'
CubicCurve ::= 'ccurve(' Point ',' Point (',' Point)+ ')'
BSpline ::= 'bspline(' Point ',' Point (',' Point)+ ')'
Point ::= Integer ',' Integer
Integer ::= [+|−] Digits
Angle ::= Degree
Range ::= 'range(' Integer ',' Integer ')'
For example, http://www.apxcom.com/events/productLaunch99#avptr(/dv/shot[1]

/frame[1012]/region::range(720,480)rect(40,40,60,60, 45) [5]

selects a 60×60 diamond-shape region from the $1012^{th}$ frame of shot one of the specified digital video tape.

Figure 10:
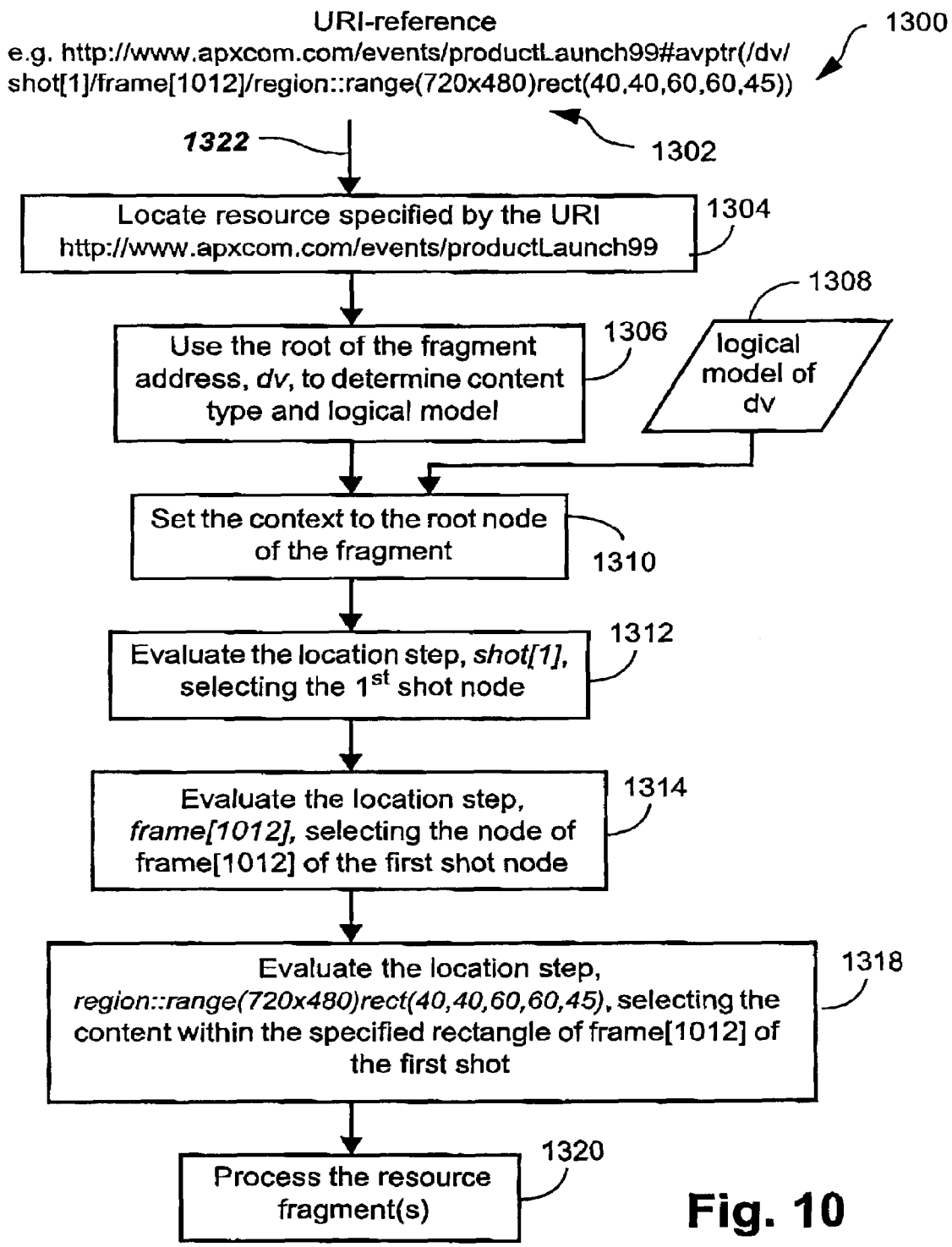
FIG. 10 shows an exemplary process for locating visual data in a region.

FIG. 10 depicts the example [5] as a process 1300 for locating visual data in a region, using the "avptr" addressing scheme. A URI reference 1302 (depicted as [5] in the body of the description) is provided, as depicted by an arrow 1322, to a step 1304 in which the URI portion (ie http://www.apxcom.com/events/productLaunch99) of the URI reference 1302 is used to locate a resource. In a following step 1306, a root of the fragment address, ie dv in the URI reference 1302, is used to determine a content type, and consequently, an associated logical model 1308. In a following step 1310, the logical model 1308 is used to set the initial context to the root node of the fragment.

Thereafter, the process 1300 is directed to a step 1312 which evaluates the location step, ie shot[1] in the URI reference 1202, thereby selecting the $1^{st}$ shot node. Thereafter, in a step 1314, the location step frame[1012] in the URI reference 1302 is evaluated, thereby selecting the node of frame [1012] of the $1^{st}$ shot node. Thereafter in a step 1318, a location step region::range(720,480)rect(40,40,60,60,45) in the URI reference 1302 is evaluated, thereby selecting content within the specified rectangle of frame[1012] of the $1^{st}$ shot. Thereafter, the process 1300 is directed to a step 1320 in which the located resource fragment is processed. The step 1320 is a post-location processing step.

As another example, http://www.apxcom.com/products/acd010239#avptr(/cdAudio/track[2]/channe/time::0s,60s) [6]

selects the first minute of the second tack of an audio CD which has the model cdAudio ::= track* track ::= channel channel Index* channel ::= sample*

The portion of the URI reference before the hash refers to the AV product, in this instance an audio CD no. 010239, belonging to a class of products, ie audio CDs, produced by the fictitious company "apxcom", which is the resource in this instance. What follows the hash sign is an "AV" fragment identifier, or pointer for locating specific AV content on the designated CD. The AV pointer is directed to the internal structure of the content, in this case the first minute of the second track. Therefore, the URI (Universal Resource Indicator), which is the familiar entity used in Internet addressing, when combined with a fragment identifier (the part of the URI reference following the hash sign), is called a URI reference.

The location steps work as follows:

|  | Selection step | Meaning | Context after the selection step |
|---|---|---|---|
| axis | (default is child::) | all the children of the context node | all the children of the cdAudio node, that is, all the track nodes |
| node-test and predicate | track[2] | any track node whose position is 2 | the $2^{nd}$ track node |
| axis | (default is child::) | all the children of the context node | all the children of the $2^{nd}$ track node |
| node-test and predicate | channel | any channel node | all the channel nodes of the $2^{nd}$ track node |
| axis | time:: | arrange the current selection continuously in time starting at time zero | unchanged |
| node-test | time::0s,60s | all content inside the time interval 0 sec to 60 sec | the first minute of the $2^{nd}$ track |

Figure 11:
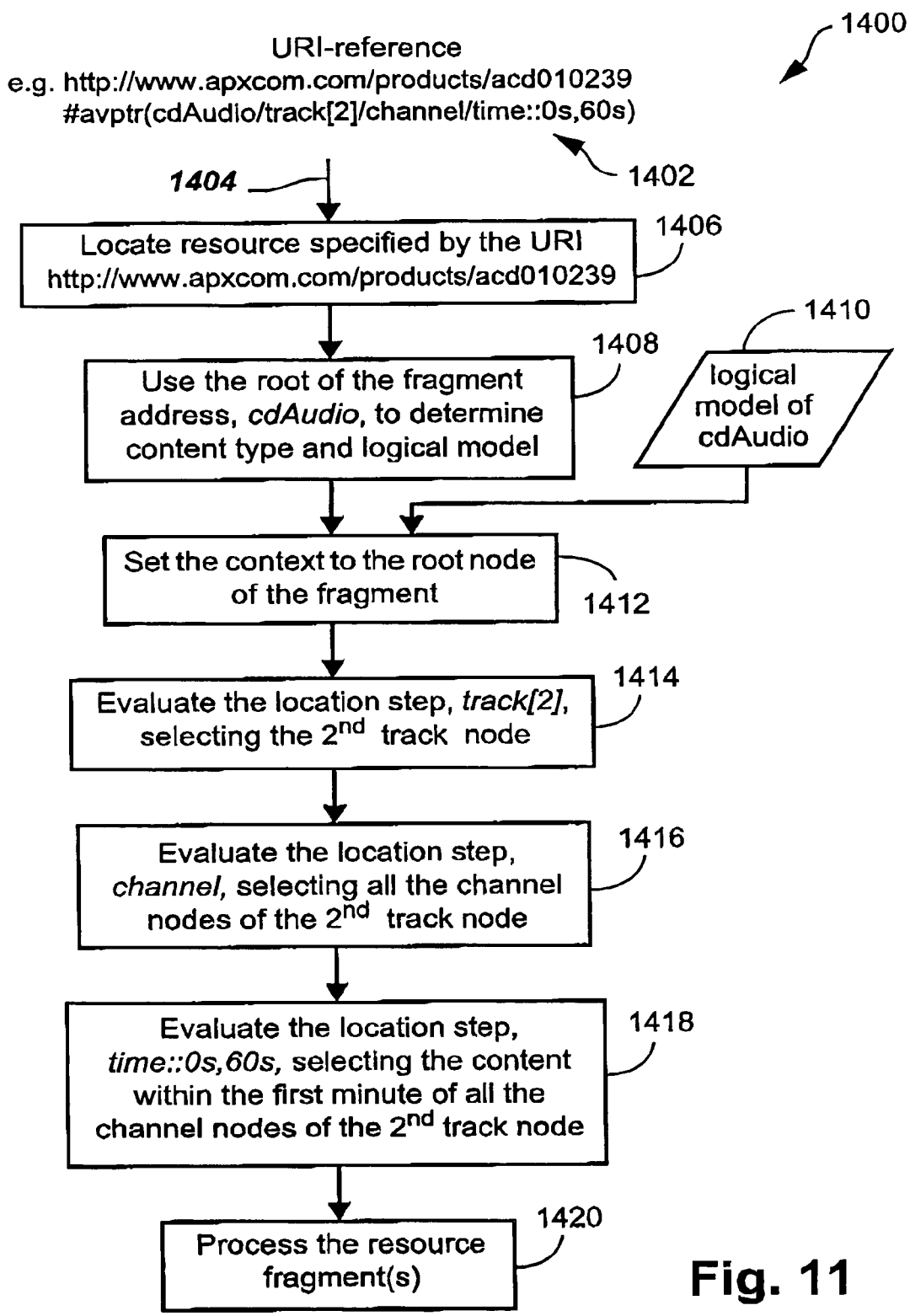
FIG. 11 shows an exemplary process for locating audio data on an audio CD.

FIG. 11 depicts the example [6] as a process 1400 for locating audio data on an audio CD, using the "avptr" addressing scheme. A URI reference 1402 (depicted as [6] in the body of the description) is provided, as depicted by an arrow 1404, to a step 1406 in which the URI portion (ie http://www.apxcom.com/products/acd010239) of the URI reference 1402 is used to locate a resource. In a following step 1408, a root of the fragment address, ie cdAudio in the URI reference 1402, is used to determine a content type, and consequently, an associated logical model 1410. In a following step 1412, the logical model 1410 is used to set the initial context to the root node of the fragment.

Thereafter, the process 1400 is directed to a step 1414 which evaluates the location step, ie track[2] in the URI reference 1402, thereby selecting the 2$^{nd}$ track node. Thereafter, in a step 1416, the location step channel in the URI reference 1402 is evaluated, thereby selecting all the channel nodes of the 2$^{nd}$ track node. Thereafter in a step 1418, a location step time::0s,60s in the URI reference 1402 is evaluated, thereby selecting content within the 1$^{st}$ minute of all the channel nodes of the 2$^{nd}$ track node. Thereafter, the process 1400 is directed to a step 1420 in which the located resource fragment is processed. The step 1420 is a post-location processing step.

In a further example (no. [7]), the URI to a 15 minutes segment of the second movie on a DVD can have the form:

http://www.apxcom.com/products/dvd0111#avptr(/
dvdVideo/title[2]/time::30m,15m) [7]

while a further example (no. [8]), ie http://www.apxcom.com/products/dvd0111#avptr(/
dvdVideo/title/chapter/audio[1]) [8]

will select the first audio track of the DVD.

In considering the above URI references, it is again noted that the portion of the URI before the hash sign refers to the AV product, namely the resource. What follows the hash sign is an AV fragment identifier for locating parts of the AV content.

Figure 12:
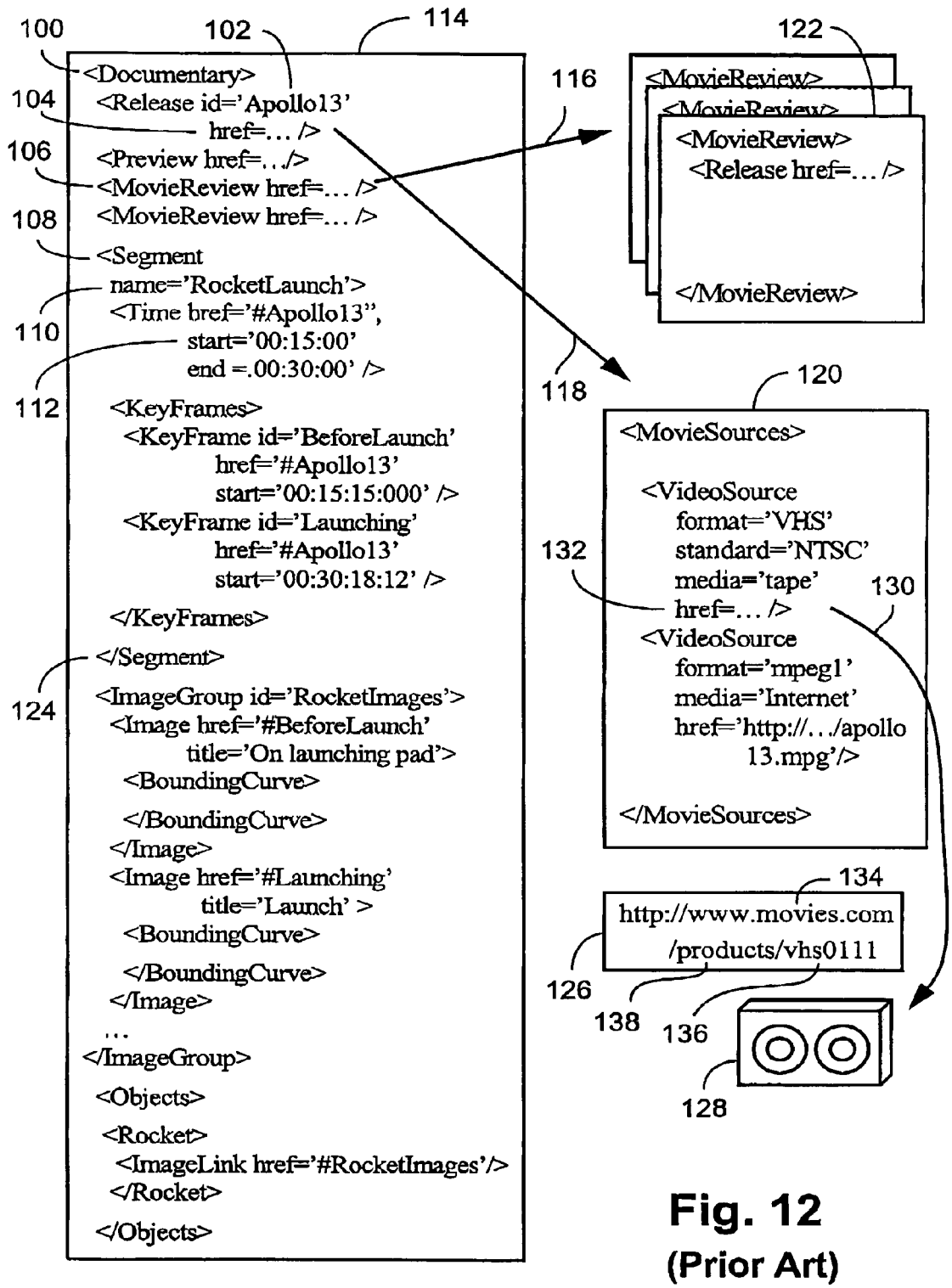
FIG. 12 depicts the locating of resources using conventional URIs.

FIG. 12 presents a description of a prior art scenario in the context of an XML document 114 presented on a browser (not shown). It is noted that the document 114 as shown depicts a physical aspect of the XML document, whereas a user of the browser would be presented with the document in a different style (not shown). The document 114 describes AV content about the Apollo 13 space mission. The document type is designated by a reference 100, which in the present instance is a "Documentary". A number of hyperlink references 104, 106 provide links to other XML documents 120, 122, which describe movie sources and movie reviews (not shown) respectively. The movie sources referred to by document 120 can be either on-line, or alternatively, can be a physical entities such as a video-cassette 128 (depicting a specific movie source in this example) produced by a company. The document 114 contains a segment 110 named "Rocket Launch" between tag delimiters 108 and 124. The rocket launch segment commences 15 minutes after the start of the documentary as indicated by the start index 112. When a user selects the release reference 104, the associated link depicted by an arrow 118 directs the user to the XML document 120 describing the movie source 128 as already noted. Selection of a reference 132 on the document 120 retrieves a URI 126, which points, as indicated by an arrow J 30, to the physical video cassette 128. The URI 126 is seen to comprise a link to a company having a domain name movies designated 134, where the specific cassette is designated "vhs0111" ie 136 in the "products" category 138. Reviewing the aforementioned process for clarity of explanation, selection by the user of the Apollo 13 reference 104 directs the user to the specific cassette 128 through a location process depicted by the URI 126. Noting that the URI has a standard format and does not incorporate a fragment identifier, it is clear that the described scenario does not support drilling down to the fragment level of the non-XML AV resource. The URI does address the particular video cassette 128, but provides no mechanism for addressing AV data on the cassette at the fragment level.

Figure 13:
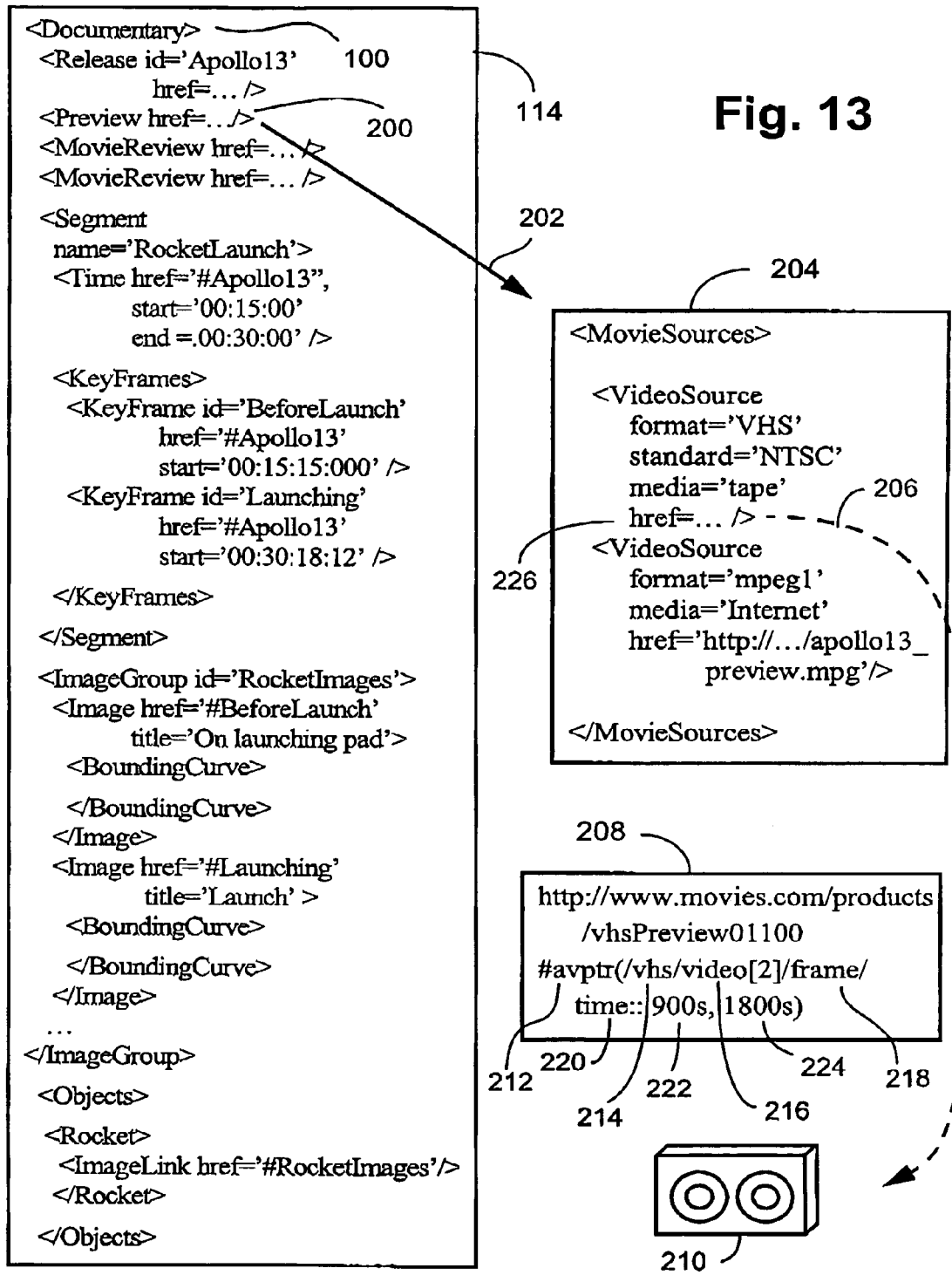
FIG. 13 illustrates use of extended URIs for fragment location according to the preferred embodiment.

Turning to FIG. 13, a preferred embodiment of the proposed addressing method is described. Selection of the preview reference 200 on the main XML document 114 activates a link depicted by an arrow 202 which is directed to another XML document 204. This latter document 204 describes preview AV material at the fragment level, and selection of a reference 226 results in a link depicted by a dashed arrow 206 pointing to an AV fragment using an extended URI 208. The portion of the URI 208 before the hash relates to VHS Preview content designated "01100", which is a product of a fictitious company called "movies". The portion of the URI after the hash is an AV pointer 212, pointing to the second video 216 of the vhs (214) tape, and in particular to a segment (218) starting 900 seconds after the start of the documentary, and ending 1800 seconds after the start of the documentary.

Figure 14:
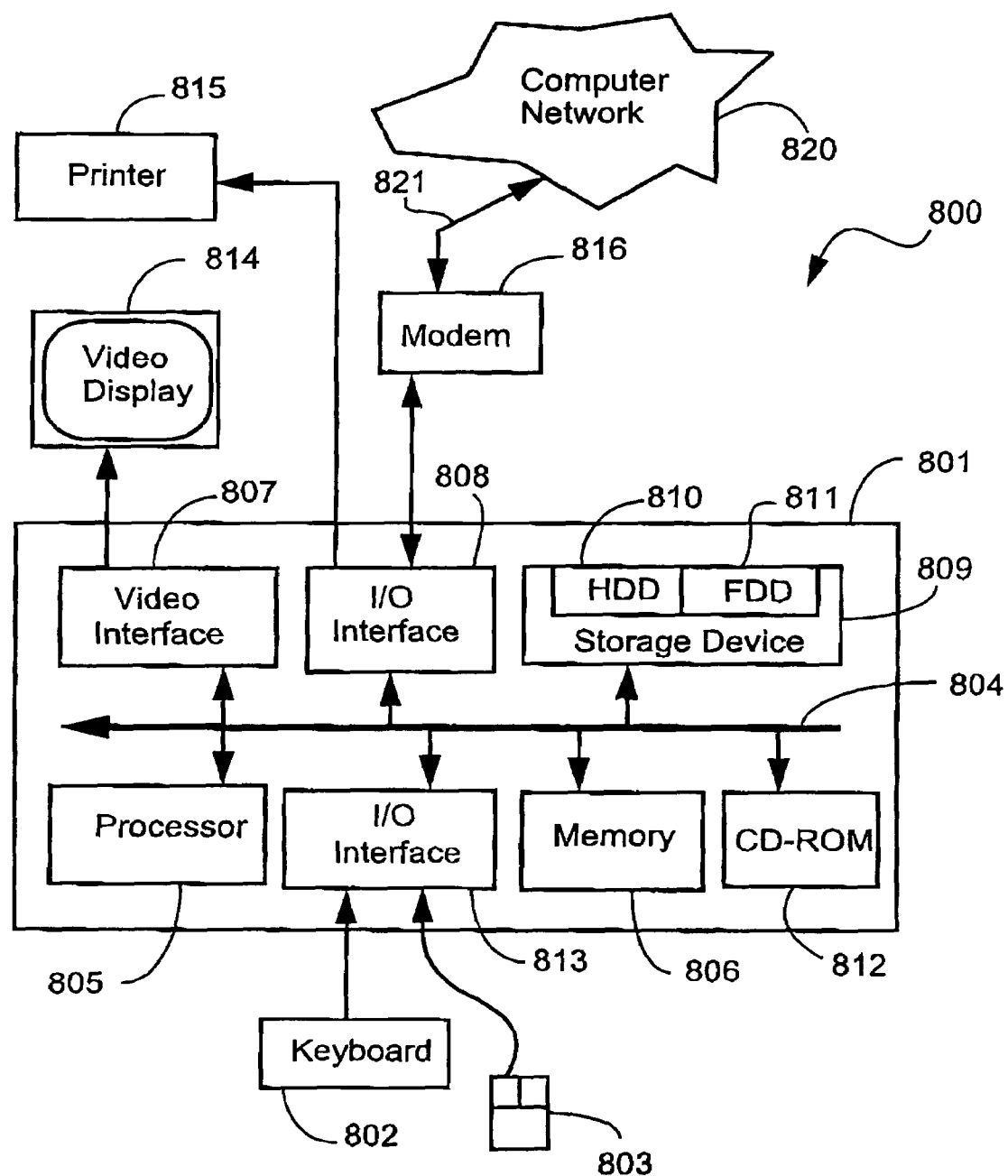
FIG. 14 is a schematic block diagram of a general purpose computer upon which the preferred embodiment of the present invention can be practiced.

The method of addressing an arbitrary fragment of an AV resource is preferably practiced using a conventional general-purpose computer system 800, such as that shown in FIG. 14 wherein the processes of FIGS. 4 and 7 to 11 may be implemented as software, such as an application program executing within the computer system 800. In particular, the steps of the method of addressing an arbitrary fragment of an AV resource are effected by instructions in the software that are carried out by the computer. The software may be divided into two separate parts; one part for carrying out the addressing methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for addressing an arbitrary fragment of an AV resource in accordance with the embodiments of the invention.

The computer system 800 comprises a computer module 801, input devices such as a keyboard 802 and mouse 803, output devices including a printer 815 and a display device 814. A Modulator-Demodulator (Modem) transceiver device 816 is used by the computer module 801 for communicating to and from a communications network 820, for example connectable via a telephone line 821 or other functional medium. The modem 816 can be used to obtain access to the Internet, and other network systems, such as a Local Area Network (LAN) or a Wide Area Network (WAN).

The computer module 801 typically includes at least one processor unit 805, a memory unit 806, for example formed from semiconductor random access memory (RAM) and read only memory (ROM), input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 810 and read and controlled in its execution by the processor 805. Intermediate storage of the program and any data fetched from the network 820 may be accomplished using the semiconductor memory 806, possibly in concert with the hard disk drive 810. In some instances, the application program may be supplied to the user encoded on a CD-ROM or floppy disk and read via the corresponding drive 812 or 811, or alternatively may be read by the user from the network 820 via the modem device 816. Still further, the software can also be loaded into the computer system 800 from other computer readable medium including magnetic tape, a ROM or integrated circuit, a magneto-optical disk, a radio or infra-red transmission channel between the computer module 801 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of addressing an arbitrary fragment of an AV resource may alternatively be implemented in dedicated hardware such as one or more integrated circuits performing the functions or sub functions of addressing. Such dedicated hardware may include graphic processors, digital signal processors, or one or more microprocessors and associated memories. The dedicated hardware described can be incorporated into specialised or general purpose equipment which addresses AV content.

Adoption of XML as a notation for describing the preferred embodiment is a convenient mechanism for describing the embodiment. It also allows a consistent view and addressing mechanism for both XML and non-XML resources. As noted previously however, this is not an essential feature of the present invention.

INDUSTRIAL APPLICABILITY

It is apparent from the above that the embodiments of the invention are applicable to the computer and data processing industries.

The foregoing describes only some embodiment of the present invention, and modifications and/or changes can be made thereto without departing from the scope and spirit of the invention, the embodiments being illustrative and not restrictive.

The invention claimed is:

1. A method for forming an address for locating an electronically accessible Audio/Video (AV) fragment of AV content, said method comprising the steps of:
    determining a network address for locating the AV content, said AV content having a logical model which describes a hierarchical representation comprising two or more levels of detail for said AV content, wherein the logical model is based on at least one of time blocks and spatial regions at a lowest level of the levels of detail, and wherein the logical model is adapted to address the fragment of said AV content;
    generating a fragment identifier for at least one fragment corresponding to at least one of said levels of detail of said AV content, using the logical model; and
    combining the network address and the fragment identifier to form a URI reference, being an address for locating the AV fragment, thereby rendering the AV fragment addressable.

2. The method according to claim 1, wherein generating the fragment identifier comprises providing an addressing scheme for addressing said at least one fragment in terms of at least one of said time blocks and said spatial regions.

3. The method according to claim 2, wherein the addressing scheme for addressing said at least one fragment includes at least one of a time axis, a time function, a region axis, and a region function.

4. The method according to claim 3, wherein the AV content is a single file in a file system supporting Audio/Video content.

5. The method according to claim 3, wherein the AV content is one from the group consisting of a Digital Versatile Disk (DVD), Compact Disk Read Only Memory (CD ROM), Audio Compact Disk (CD), Video Tape and Audio Tape.

6. The method according to claim 3, wherein the addressing scheme provides a syntax for addressing one or more AV fragments in the fragment identifier.

7. The method according to claim 2, wherein said addressing scheme is Xpath based.

8. The method according to claim 1, wherein the fragment of AV content is not addressable by only the network address.

9. The method according to claim 1, wherein AV content comprises monolithic blocks of information represented by said two or more levels of detail.

10. The method according to claim 9, wherein said fragment identifier uses a level of detail that is neither visible nor addressable.

11. An apparatus for forming an address for locating an electronically accessible Audio/Video (AV) fragment of AV content, said apparatus comprising:
    a memory for storing a program; and
    a processor for executing the program, said program comprising:
        code for determining a network address for locating the AV content, said AV content having a logical model which describes a hierarchical representation comprising two or more levels of detail for said AV content, wherein the logical model is based on at least one of time blocks and spatial regions at a lowest level of the levels of detail, and wherein the logical model is adapted to address the fragment of said AV content;
        code for generating a fragment identifier for at least one fragment corresponding to at least one of said levels of detail of said AV content, using the logical model; and
        code for combining the network address and the fragment identifier to form a URI reference, being an address for locating the AV fragment, thereby rendering the AV fragment addressable.

12. The apparatus according to claim 11, wherein the code for generating the fragment identifier comprises code for providing an addressing scheme for addressing said at least one fragment in terms of at least one of said time blocks and said spatial regions.

13. The apparatus according to claim 12, wherein the addressing scheme for addressing said at least one fragment includes at least one of a time axis, a time function, a region axis, and a region function.

14. The apparatus according to claim 13, wherein the AV content is a single file in a file system supporting Audio/Video content.

15. The apparatus according to claim 13, wherein the AV content is one from the group consisting of a Digital Versatile Disk (DVD), Compact Disk Read Only Memory (CD ROM), Audio Compact Disk (CD), Video Tape and Audio Tape.

16. The apparatus according to claim 13, wherein the addressing scheme provides a syntax for addressing one or more AV fragments in the fragment identifier.

17. The apparatus according to claim 12, wherein said addressing scheme is Xpath based.

18. The apparatus according to claim 11, wherein AV content comprises monolithic blocks of information represented by said two or more levels of detail.

19. The apparatus according to claim 18, wherein said fragment identifier uses a level of detail that is neither visible nor addressable.

20. A computer program product including a computer readable storage medium having recorded thereon a computer program for directing a processor to execute a method for forming an address for locating an electronically accessible Audio/Video (AV) fragment of AV content, said program comprising:

code for determining a network address for locating the AV content, said AV content having a logical model which describes a hierarchical representation comprising two or more levels of detail for said AV content, wherein the logical model is based on at least one of time blocks and spatial regions at a lowest level of the levels of detail, and wherein the logical model is adapted to address the fragment of said AV content;

code for generating a fragment identifier for at least one fragment corresponding to at least one of said levels of detail of said AV content, using the logical model; and code for combining the network address and the fragment identifier to form a URI reference, being an address for locating the AV fragment, thereby rendering the AV fragment addressable.

21. The computer program product according to claim 20, wherein the code for generating the fragment identifier comprises code for providing an addressing scheme for addressing said at least one fragment in terms of at least one of said time blocks and said spatial regions.

22. The computer program product according to claim 21, wherein the addressing scheme for addressing said at least one fragment includes at least one of a time axis, a time function, a region axis, and a region function.

23. The computer program product according to claim 22, wherein the AV content is a single file in a file system supporting Audio/Video content.

24. The computer program product according to claim 22, wherein the AV content is one from the group consisting of a Digital Versatile Disk (DVD), Compact Disk Read Only Memory (CD ROM), Audio Compact Disk (CD), Video Tape and Audio Tape.

25. The computer program product according to claim 22, wherein the addressing scheme provides a syntax for addressing one or more AV fragments in the fragment identifier.

26. The computer program product according to claim 21, wherein said addressing scheme is Xpath based.

27. The computer program product according to claim 20, wherein AV content comprises monolithic blocks of information represented by said two or more levels of detail.

28. The computer program product according to claim 27, wherein said fragment identifier uses a level of detail that is neither visible nor addressable.

29. A method for forming an address for locating an electronically accessible audio fragment of audio content, said method comprising the steps of:

determining a network address for locating the audio content, said audio content having a logical model which describes a hierarchical representation comprising two or more levels of detail for said audio content, wherein the logical model is based upon time blocks at a lowest level of the levels of detail, and wherein the logical model is adapted to address the fragment of said audio content;

generating a fragment identifier for at least one fragment corresponding to at least one of said levels of detail of said audio content, using the logical model; and combining the network address and the fragment identifier to form a URI reference, being an address for locating the audio fragment, thereby rendering the audio fragment addressable.

30. The method according to claim 29, wherein audio content comprises monolithic blocks of information represented by said two or more levels of detail.

31. The method according to claim 30, wherein said fragment identifier uses a level of detail that is neither visible nor addressable.

32. A method for forming an address for locating an electronically accessible image fragment of image content, said method comprising the steps of:

determining a network address for locating the image content said image content having a logical model which describes a hierarchical representation comprising two or more levels of detail for said image content, wherein the logical model is based upon spatial regions at a lowest level of the levels of detail, and wherein the logical model is adapted to address the fragment of said image content;

generating a fragment identifier for at least one fragment corresponding to at least one of said levels of detail of said image content, using the logical model; and combining the network address and the fragment identifier to form a URI reference, being an address for locating the image fragment, thereby rendering the image fragment addressable.

33. The method according to claim 32, wherein image content comprises monolithic blocks of information represented by said two or more levels of detail.

34. The method according to claim 33, wherein said fragment identifier uses a level of detail that is neither visible nor addressable.

35. A method for forming an address for locating an electronically accessible video fragment of video content, said method comprising the steps of:

determining a network address for locating the video content, said video content having a logical model which describes a hierarchical representation comprising two or more levels of detail for said video content, wherein the logical model is based upon at least one of time blocks and spatial regions at a lowest level of the levels of detail, and wherein the logical model is adapted to address the fragment of said video content;

generating a fragment identifier for at least one fragment corresponding to at least one of said levels of detail of said video content, using the logical model; and combining the network address and the fragment identifier to form a URI reference, being an address for locating the video fragment, thereby rendering the video fragment addressable.

36. The method according to claim 35, wherein video content comprises monolithic blocks of information represented by said two or more levels of detail.

37. The method according to claim 36, wherein said fragment identifier uses a level of detail that is neither visible nor addressable.

* * * * *